United States Patent
Koga et al.

(10) Patent No.: US 10,527,017 B2
(45) Date of Patent: *Jan. 7, 2020

(54) HIGH-PRESSURE PUMP

(71) Applicant: DENSO CORPORATION, Kariya, Aichi-pref. (JP)

(72) Inventors: Tatsuro Koga, Kariya (JP); Noriya Matsumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/580,332

(22) PCT Filed: May 10, 2016

(86) PCT No.: PCT/JP2016/002289
§ 371 (c)(1),
(2) Date: Dec. 7, 2017

(87) PCT Pub. No.: WO2016/199343
PCT Pub. Date: Dec. 15, 2016

(65) Prior Publication Data
US 2018/0135580 A1 May 17, 2018

(30) Foreign Application Priority Data
Jun. 10, 2015 (JP) .................. 2015-117485

(51) Int. Cl.
*F02M 59/46* (2006.01)
*F02M 69/54* (2006.01)
(Continued)

(52) U.S. Cl.
CPC .......... *F02M 59/46* (2013.01); *F02M 59/025* (2013.01); *F16K 17/04* (2013.01); *F02M 59/102* (2013.01); *F02M 59/442* (2013.01)

(58) Field of Classification Search
CPC ...... F02M 59/46; F02M 59/025; F02M 69/54; F16K 17/0433; F16K 17/04
See application file for complete search history.

(56) References Cited

U.S. PATENT DOCUMENTS

| | | | |
|---|---|---|---|
| 1,767,538 A | 6/1930 | Mahan | |
| 4,018,314 A * | 4/1977 | Richmond | ............. B60R 25/08 |
| | | | 188/353 |

(Continued)

FOREIGN PATENT DOCUMENTS

| | | |
|---|---|---|
| JP | 2012-052464 | 3/2012 |
| JP | 5501272 | 5/2014 |
| JP | 2015-75049 | 4/2015 |

OTHER PUBLICATIONS

Koga, et al., U.S. Appl. No. 15/580,322, filed Dec. 7, 2017 (59 pages).

(Continued)

*Primary Examiner* — Mary E McManmon
*Assistant Examiner* — Angelisa L. Hicks
(74) *Attorney, Agent, or Firm* — Nixon & Vanderhye, P.C.

(57) ABSTRACT

In a high-pressure pump, a relief valve seat surrounds an opening of a relief valve passage of a valve seat main body in a first space. A relief valve member includes a relief valve main body and a relief valve seat portion. The relief valve main body has a rod shape. The relief valve seat portion is integrated with an end of the relief valve main body so as to be capable of contacting the relief valve seat. The relief valve member is provided in the first space so as to be reciprocable in an axial direction. A relief valve urging member urges the relief valve member toward the relief valve seat. A support portion includes a support main body that slidably supports an outer wall of the relief valve main (Continued)

body so as to guide a reciprocating movement of the relief valve member in the axial direction.

11 Claims, 7 Drawing Sheets

(51) Int. Cl.
*F16K 17/04* (2006.01)
*F02M 59/02* (2006.01)
*F02M 59/10* (2006.01)
*F02M 59/44* (2006.01)

(56) References Cited

U.S. PATENT DOCUMENTS

| | | | | |
|---|---|---|---|---|
| 5,251,664 A * | 10/1993 | Arvidsson | ............. | F16K 15/026 137/469 |
| 5,290,096 A | 3/1994 | Beck et al. | | |
| 5,365,974 A * | 11/1994 | Maravic | ................. | F16K 17/30 137/493 |
| 5,373,828 A * | 12/1994 | Askew | ................. | F02M 59/366 123/458 |
| 5,390,993 A | 2/1995 | Beck et al. | | |
| 5,623,910 A | 4/1997 | Riggle | | |
| 7,086,388 B2 * | 8/2006 | Roth | ..................... | F16K 17/196 123/510 |
| 8,561,638 B2 * | 10/2013 | Yamaguchi | ...... | B60K 15/03519 137/493.6 |
| 9,534,539 B2 * | 1/2017 | Carrere | .................... | F16K 17/18 |
| 2011/0114064 A1 * | 5/2011 | Akita | ................... | F02M 55/002 123/495 |
| 2011/0315005 A1 | 12/2011 | Oikawa et al. | | |
| 2012/0227711 A1 | 9/2012 | Saito | | |
| 2014/0182451 A1 | 7/2014 | Oikawa et al. | | |
| 2014/0314605 A1 * | 10/2014 | Koga | ................. | F02M 37/0023 417/568 |
| 2015/0078922 A1 | 3/2015 | Oikawa et al. | | |

OTHER PUBLICATIONS

International Search Report for PCT/JP2016/002289, dated Jul. 5, 2016, 4 pages.

* cited by examiner

HIGH-PRESSURE PUMP

CROSS REFERENCE TO RELATED APPLICATION

This application is the U.S. national phase of International Application No. PCT/JP2016/002289 filed on May 10, 2016, which designated the U.S. and claims priority to Japanese Patent Application No. 2015-117485 filed on Jun. 10, 2015, the entire contents of each of which are hereby incorporated by reference.

TECHNICAL FIELD

The present disclosure relates to a high-pressure pump that pressurizes and discharges a fuel.

BACKGROUND ART

Up to now, a high-pressure pump has been known, in which a discharge valve and a relief valve are integrated with each other in a discharge passage through which a fuel pressurized in a pressurizing chamber flows. For example, in a high-pressure pump disclosed in Patent Literature 1, a spherical valve body is used as a valve body of the relief valve.

The high-pressure pump of Patent Literature 1 includes a holder that holds the valve body of the relief valve and an urging member that urges the valve body toward a valve seat through the holder. In this case, the movement of the valve body and the holder is not guided by another member, and can move relatively freely in a space between the pressurizing chamber and the valve seat. The fuel discharged from the pressurizing chamber of the high-pressure pump flows around the valve body and the holder to be discharged to the outside of the high-pressure pump. For that reason, the valve body and the holder may move or vibrate due to a flow of the fuel. If the valve body moves or vibrates in a state where the valve body is in contact with the valve seat, the valve seat or the valve body may be worn. If the valve seat or the valve body wears, a valve opening pressure of the relief valve may change over time.

Further, in the high-pressure pump of Patent Literature 1, since the valve body and the holder are formed separately from each other, there is a possibility that the valve body and the holder move relative to each other and the position of the valve body becomes unstable. As a result, wear of the valve seat or the valve body may be accelerated.

PRIOR ART LITERATURE

Patent Literature

Patent Literature 1: JP 5501272 B

SUMMARY

The present disclosure has been made in view of the points described above, and an object of the present disclosure is to provide a high-pressure pump capable of reducing a change over time in valve opening pressure of a relief valve member.

According to an aspect of the present disclosure, a high-pressure pump includes a pump body, a valve seat portion, a discharge valve member, a discharge valve urging member, a relief valve member, a relief valve urging member and a support portion. The pump body includes a pressurizing chamber that pressurizes a fuel, and a discharge passage through which the fuel pressurized and discharged by the pressurizing chamber flows. The valve seat portion includes a valve seat main body, a discharge valve passage, a relief valve passage, a discharge valve seat and a relief valve seat.

The valve seat main body is provided in the discharge passage to partition the discharge passage into a first space positioned between the valve seat main body and the pressurizing chamber and a second space positioned on an opposite side of the valve seat main body from the pressurizing chamber. The discharge valve passage is provided in the valve seat main body and connects the first space and the second space. The relief valve passage which is provided in the valve seat main body and connects the second space and the first space without communicating with the discharge valve passage. The discharge valve seat has an annular shape and surrounds an opening of the discharge valve passage of the valve seat main body in the second space. The relief valve seat has an annular shape and surrounds an opening of the relieve valve passage of the valve seat main body in the first space.

The discharge valve member is provided in the second space to be capable of contacting the discharge valve seat, and the discharge valve member opens or closes the discharge valve passage when separating from the discharge valve seat or contacting the discharge valve seat. The discharge valve urging member urges the discharge valve member toward the discharge valve seat. The relief valve member includes a relief valve main body and a relief valve seat portion.

The relief valve main body has a rod shape. The relief valve seat portion is integrated with a first end of the relief valve main body in the axial direction and is capable of contacting the relief valve seat. The relief valve member is provided in the first space to be reciprocable in an axial direction. The relief valve urging member urges the relief valve member toward the relief valve seat. The support portion includes a support main body which slidably supports an outer wall of the relief valve main body and guides reciprocating movement of the relief valve member in the axial direction.

In the above aspect of the present disclosure, the support main body of the support portion slidably supports the outer wall of the relief valve main body so as to guide the reciprocating movement of the relief valve member in the axial direction. For that reason, even if the fuel discharged from the pressurizing chamber in the high-pressure pump flows around the relief valve member, the relief valve seat portion of the relief valve member is prevented from relatively moving or oscillating in the radial direction with respect to the relief valve seat. As a result, wear of the relief valve seat or the relief valve seat portion can be reduced. Therefore, a change over time in the valve opening pressure of the relief valve member can be reduced.

In the above aspect of the present disclosure, the relief valve seat portion is integrally formed with the relief valve main body. For that reason, the relief valve seat portion and the relief valve main body do not move relative to each other. Therefore, the position of the relief valve seat portion is stabilized, for example, as compared with a configuration in which the relief valve main body and the relief valve seat portion are formed separately from each other. Therefore, the wear of the relief valve seat or the relief valve seat portion can be further reduced.

DESCRIPTION OF EMBODIMENTS

Figure 1:
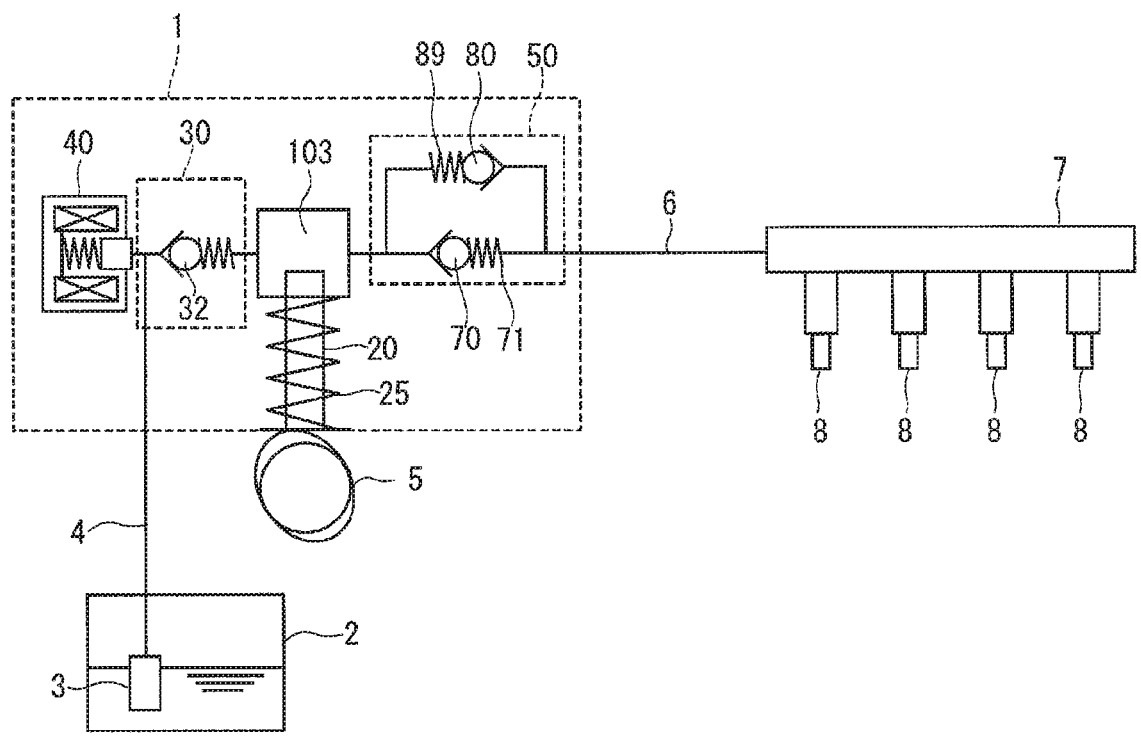
FIG. 1 is a schematic diagram showing a high-pressure pump according to a first embodiment of the present disclosure.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
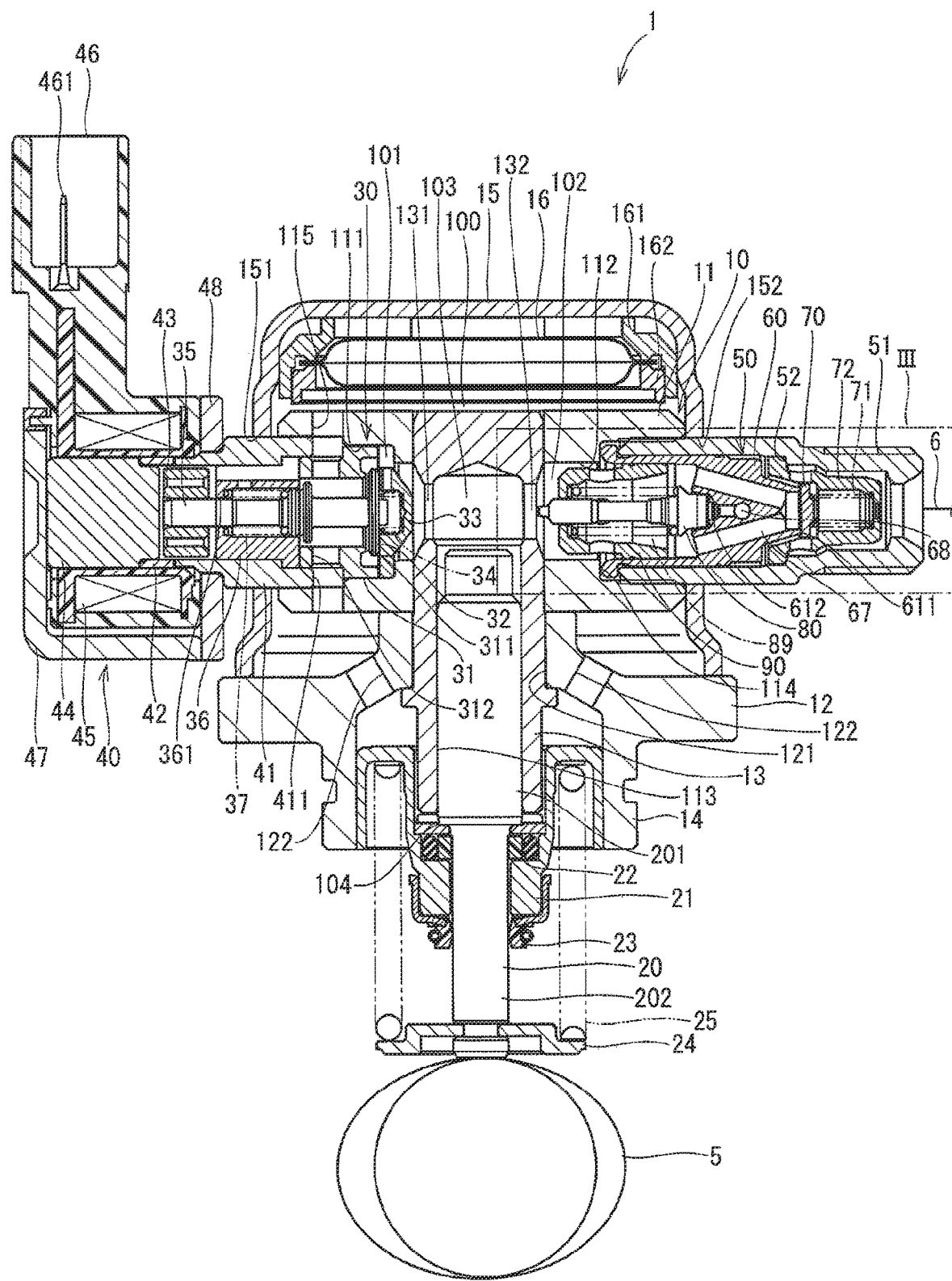
FIG. 2 is a cross-sectional view showing a high-pressure pump according to the first embodiment.

A high-pressure pump according to a first embodiment of the present disclosure is illustrated in FIG. 2.

A high-pressure pump 1 is provided in a vehicle not shown. The high-pressure pump 1 is a pump that supplies a fuel at a high pressure to an engine, for example, as an internal combustion engine. The fuel supplied to the engine by the high-pressure pump 1 is, for example, gasoline. In other words, a fuel supply target of the high-pressure pump 1 is a gasoline engine.

As illustrated in FIG. 1, the fuel stored in the fuel tank 2 is supplied to the high-pressure pump 1 through a pipe 4 by a fuel pump 3. The high-pressure pump 1 pressurizes the fuel supplied from the fuel pump 3 and discharges the pressurized fuel to a fuel rail 7 through a pipe 6. As a result, the fuel in the fuel rail 7 is accumulated and injected and supplied to the engine from fuel injection valves 8 connected to the fuel rail 7. As illustrated in FIG. 2, the high-pressure pump 1 includes a pump body 10, a cover 15, a pulsation damper 16, a plunger 20, an intake valve device 30, an electromagnetic drive portion 40, a discharge valve device 50, and the like. The pump body 10 includes an upper housing 11, a lower housing 12, a cylinder 13, a holder support portion 14, a union 51, and the like.

The upper housing 11 is formed in a substantially rectangular parallelepiped block shape and made of a metal such as stainless steel. The upper housing 11 includes an intake hole portion 111, a discharge hole portion 112, a cylinder hole portion 113, a step portion 114, and the like. The intake hole portion 111 opens at one end of the upper housing 11 in a longitudinal direction and is formed in a substantially cylindrical shape so as to extend in the longitudinal direction. As a result, an intake passage 101 is formed inside the intake hole portion 111. The discharge hole portion 112 opens at the other end of the upper housing 11 in the longitudinal direction and is formed in a substantially cylindrical shape so as to extend in the longitudinal direction. As a result, a discharge passage 102 is provided inside the discharge hole portion 112. In this example, the intake hole portion 111 and the discharge hole portion 112 are coaxially provided.

The cylinder hole portion 113 is formed in a substantially cylindrical shape between the intake hole portion 111 and the discharge hole portion 112 so as to open at both end portions of the upper housing 11 in a lateral direction. In this example, a space inside the cylinder hole portion 113 is connected to the intake passage 101 and the discharge passage 102. The step portion 114 is provided on an inner wall of the upper housing 11 provided with the discharge hole portion 112. An inner diameter of a part of the discharge hole portion 112 extending from the step portion 114 toward the intake hole portion 111 is smaller than an inner diameter of a part of the discharge hole portion 112 extending from the step portion 114 in a direction away from the intake hole portion 111 (refer to FIGS. 2 and 3).

The lower housing 12 is formed in a plate shape and made of a metal such as stainless steel. The lower housing 12 includes a cylinder hole portion 121. The cylinder hole portion 121 is formed in a substantially circular shape so as to penetrate through the lower housing 12 in a plate thickness direction. The lower housing 12 is provided so as to be engaged with the upper housing 11 so that the cylinder hole portion 113 and the cylinder hole portion 121 are coaxially provided. In this example, the upper housing 11 and the lower housing 12 correspond to a "housing" in the claims.

The cylinder 13 is formed in a bottomed cylindrical shape and made of a metal such as stainless steel. The cylinder 13 has an intake hole 131 and a discharge hole 132. The intake hole 131 and the discharge hole 132 are provided in the vicinity of a bottom portion of the cylinder portion of the cylinder 13 so as to face each other. In other words, the intake hole 131 and the discharge hole 132 are formed so as to extend in the radial direction of the cylinder 13 so as to sandwich the axis of the cylinder 13 between the intake hole 131 and the discharge hole 132. The cylinder 13 is inserted through the cylinder hole portion 113 of the upper housing 11 and the cylinder hole portion 121 of the lower housing 12 so that the intake hole 131 is connected to the intake passage 101 and the discharge hole 132 is connected to the discharge passage 102. An outer wall of a bottom end portion of the cylinder 13 is fitted to an inner wall forming the cylinder hole portion 113 of the upper housing 11.

The holder support portion 14 is formed in a substantially cylindrical shape and made of a metal such as stainless steel. One end of the holder support portion 14 is provided to connect to an opposite side of the lower housing 12 from the upper housing 11 so that the holder support portion 14 is coaxial with the cylinder 13. In the present embodiment, the holder support portion 14 is formed integrally with the lower housing 12.

The union 51 is formed in a substantially cylindrical shape and made of a metal such as stainless steel. The union 51 is provided such that one end of the union 51 is inserted into the discharge hole portion 112 of the upper housing 11. In the present embodiment, the union 51 has threads on the outer wall at one end, and the upper housing 11 has screw grooves on the inner wall of the discharge hole portion 112. The union 51 is fixed to the upper housing 11 by being screwed into the discharge hole portion 112. The union 51 forms the discharge passage 102 therein. Further, the union 51 has a step portion 52. The step portion 52 is formed on an inner wall of the union 51. An inner diameter of a part of the union 51 extending from the step portion 52 toward the step portion 114 is larger than an inner diameter of another part of the union 51 extending from the step portion 52 in a direction away from the step portion 114 (refer to FIGS. 2 and 3). The other end of the union 51, that is, an end portion of the union 51 opposite from the upper housing 11 is connected to an end of the pipe 6 opposite from the fuel rail 7.

The cover 15 is formed in a bottomed cylindrical shape, that is, a cup shape, and made of a metal such as stainless steel. The cover 15 accommodates the upper housing 11 therein, and an end portion of the cover 15 on its opening side is connected to an outer edge portion of the lower housing 12. The cover 15 and the lower housing 12 are connected to each other by welding over the entire circumference. As a result, the cover 15 and the lower housing 12 are liquid-tightly kept. A fuel gallery 100 is formed between the inside of the cover 15 and the lower housing 12. The cover 15 is provided with an inlet portion not shown. A pipe 4 connected to the fuel pump 3 is connected to the inlet portion. As a result, the fuel in the fuel tank 2 flows into the inside of the cover 15, that is, into the fuel gallery 100 through the inlet portion.

The cover 15 has a first hole 151 and a second hole 152. The first hole 151 and the second hole 152 are each formed so as to connect the inner wall and the outer wall of the cover 15. The first hole 151 and the second hole 152 are formed at positions corresponding to the intake hole portion 111 and the discharge hole portion 112 of the upper housing 11, respectively. In this example, the union 51 is provided so as to be inserted through the second hole 152 of the cover 15 and the discharge hole portion 112 of the upper housing 11. The outer wall of the union 51 and the second hole 152 of the cover 15 are welded together over the entire circumference. As a result, the union 51 and the cover 15 are liquid-tightly kept.

The pulsation damper 16 is provided between a bottom portion of the cover 15 and the upper housing 11. The pulsation damper 16 is formed, for example, by joining peripheral portions of two diaphragms together, and gas at a predetermined pressure is sealed inside the pulsation damper 16. A locking member 161 is provided in the vicinity of the bottom portion of the cover 15. A damper support portion 162 is provided on a side of the locking member 161 facing the upper housing 11. The damper support portion 162 sandwiches an outer edge portion of the pulsation damper 16 in cooperation with the locking member 161 and is fitted to the locking member 161, to thereby support the pulsation damper 16. The pulsation damper 16 is capable of reducing fuel pressure pulsation with elastic deformation according to a change in the fuel pressure in the fuel gallery 100.

The plunger 20 is formed in a substantially columnar shape and made of a metal such as stainless steel. The plunger 20 includes a large diameter portion 201 and a small diameter portion 202. The small diameter portion 202 has an outer diameter smaller than an outer diameter of the large diameter portion 201. The large diameter portion 201 and the small diameter portion 202 are coaxially integrated together. The plunger 20 is provided such that the large diameter portion 201 is inserted into the inside of the cylinder 13. The outer diameter of the large diameter portion 201 of the plunger 20 is formed to be substantially equal to an inner diameter of the cylinder 13 or slightly smaller than the inner diameter of the cylinder 13. With the above configuration, the plunger 20 is supported such that an outer wall of the large diameter portion 201 slides on an inner wall of the cylinder 13 and is reciprocally movable in the axial direction by the cylinder 13. A pressurizing chamber 103 is provided between inner walls of a cylinder portion and a bottom portion of the cylinder 13 and an outer wall of an end portion of the large diameter portion 201 of the plunger 20. A volume of the pressurizing chamber 103 changes when the plunger 20 reciprocates in the cylinder 13.

In the present embodiment, a seal holder 21 is provided inside the holder support portion 14. The seal holder 21 is formed in a cylindrical shape and made of a metal such as stainless steel. The seal holder 21 is provided so that an outer wall of the seal holder 21 is fitted to an inner wall of the holder support portion 14. The seal holder 21 is provided so as to provide a substantially cylindrical clearance between the inner wall of an end portion of the seal holder 21 opposite to the cylinder 13 and the outer wall of the small diameter portion 202 of the plunger 20. The seal 22 having the annular seal 22 between the inner wall of the seal holder 21 and the outer wall of the small diameter portion 202 of the plunger 20 includes a ring made of Teflon (registered trademark) on a radially inner side and a ring made of rubber on a radially outer side. A thickness of a fuel oil film around the small diameter portion 202 of the plunger 20 is adjusted by the seal 22, and leakage of the fuel to the engine is prevented. An oil seal 23 is provided at an end portion of the seal holder 21 opposite from the cylinder 13. The thickness of the oil film around the small diameter portion 202 of the plunger 20 is adjusted by the oil seal 23, and leakage of oil is prevented.

A variable volume chamber 104 whose volume changes when the plunger 20 reciprocates is provided between a stepped surface between the large diameter portion 201 and the small diameter portion 202 of the plunger 20 and the seal 22. Further, in the present embodiment, the lower housing 12 has a hole portion 122 capable of communicating the fuel gallery 100 with the variable volume chamber 104. As a result, the fuel in the fuel gallery 100 can move back and forth relative to the variable volume chamber 104 through the hole portion 122.

A substantially disc shaped spring seat 24 is provided at an end portion of the small diameter portion 202 of the plunger 20 opposite from the large diameter portion 201. An urging member 25 is provided between the seal holder 21 and the spring seat 24. The urging member 25 is formed of, for example, a coil spring, one end of which is in contact with the spring seat 24 and another end of which is in contact with the seal holder 21. The urging member 25 urges the plunger 20 through the spring seat 24 in a direction away from the pressurizing chamber 103.

The high-pressure pump 1 is disposed in an engine in such a manner that the end portion of the small diameter portion 202 of the plunger 20 opposite from the large diameter portion 201 is in contact with a cam 5 of a camshaft which rotates in conjunction with a drive shaft of the engine (refer to FIG. 1). As a result, when the engine is rotating, the plunger 20 reciprocates in the axial direction with the rotation of the cam 5. At this time, the respective volumes of the pressurizing chamber 103 and the variable volume chamber 104 are periodically changed. The intake valve device 30 is provided in the intake passage 101 of the upper housing 11. The intake valve device 30 includes an intake valve seat portion 31, an intake valve member 32, a stopper 33, an intake valve urging member 34, and the like.

The intake valve seat portion 31 is formed in a cylindrical shape and made of a metal such as stainless steel. The intake valve seat portion 31 is provided so that an outer wall of the intake valve seat portion 31 is fitted to an inner wall of the upper housing 11 forming the intake hole portion 111. The intake valve seat portion 31 has an intake valve seat 311. The intake valve seat 311 has annular shape and surrounds a hole in the center of a wall surface of the intake valve seat portion 31 facing the pressurizing chamber 103.

The intake valve member 32 is made of a metal such as stainless steel. The intake valve member 32 has, for example, a substantially disc-shaped plate portion. The intake valve member 32 is provided such that a plate portion of the intake valve member 32 can contact the intake valve seat 311 and can reciprocate within the intake passage 101.

The stopper 33 is formed in a bottomed cylindrical shape and made of a metal such as stainless steel. The stopper 33 is provided so that an outer wall of the stopper 33 is fitted to the inner wall of the upper housing 11 forming the intake hole portion 111. The intake valve urging member 34 is provided between the plate portion of the intake valve member 32 and the bottom portion of the stopper 33. The intake valve urging member 34 urges the intake valve member 32 toward the intake valve seat 311.

In the present embodiment, the fuel is capable of flowing through a flow channel provided in an outer edge portion of the stopper 33 between a space between the intake valve seat portion 31 and the stopper 33 and a space between the pressurizing chamber 103 and the stopper 33. In addition, the stopper 33 is, by contacting the intake valve member 32, capable of limiting the movement of the intake valve member 32 toward the pressurizing chamber 103, that is, the movement in a valve opening direction. Further, the stopper 33 has a bottom portion between the intake valve member 32 and the pressurizing chamber 103, thereby being capable of preventing the fuel from the pressurizing chamber 103 from colliding with the intake valve member 32.

The electromagnetic drive portion 40 is provided in the vicinity of the intake valve device 30. The electromagnetic drive portion 40 includes a cylinder member 41, a nonmagnetic member 42, a needle 35, a needle guide portion 36, a needle urging member 37, a movable core 43, a fixed core 44, a coil 45, a connector 46, cover members 47 and 48, and so on.

The cylinder member 41 is formed in a substantially cylindrical shape and made of a magnetic material, for example. The cylinder member 41 is provided so as to be inserted through the first hole 151 of the cover 15 and the intake hole portion 111 of the upper housing 11. An outer wall of one end of the cylinder member 41 is fitted to an inner wall of the intake hole portion 111 of the upper housing 11. In this example, the intake valve seat portion 31 and the stopper 33 are sandwiched between one end of the cylinder member 41 and the inner wall forming the intake hole portion 111 of the upper housing 11. An end portion of the intake valve seat portion 31 opposite from the intake valve seat 311 is located inside one end of the cylinder member 41.

The intake valve seat portion 31 has a hole portion 312 that connects an inner wall and an outer wall of the intake valve seat portion 31. A plurality of the hole portions 312 are provided at regular intervals in a circumferential direction of the intake valve seat portion 31. In the present embodiment, two hole portions 312 are provided. In other words, the two hole portions 312 are provided to face each other across an axis of the intake valve seat portion 31. Further, the cylinder member 41 has a groove portion 411 provided so as to be notched from one end of the cylinder member 41 toward the other end. Two groove portions 411 are provided in total at positions corresponding to the hole portions 312 of the intake valve seat portion 31 one by one. Further, the upper housing 11 has a hole portion 115 that connects an inner wall and an outer wall forming the intake hole portion 111. Two hole portions 115 are provided in total at positions corresponding to the groove portions 411 of the cylinder member 41 one by one. The fuel in the fuel gallery 100 can flow into the inside of the intake valve seat portion 31 through the hole portion 115, the groove portion 411, and the hole portion 312. The fuel that has flowed into the inside of the intake valve seat portion 31 can flow toward the pressurizing chamber 103 through between the intake valve seat 311 and the intake valve member 32 and through the flow channel of the stopper 33.

Further, the outer wall of the cylinder member 41 and the first hole 151 of the cover 15 are welded over an entire circumference. As a result, the cylinder member 41 and the cover 15 are liquid-tightly kept. The nonmagnetic member 42 is formed in a cylindrical shape and made of a nonmagnetic material. The nonmagnetic member 42 is provided on the side of the cylinder member 41 facing away from the upper housing 11 so as to be coaxial with the cylinder member 41. The needle 35 is formed in a rod shape and made of, for example, a metal. The needle 35 is provided so as to reciprocate in the axial direction inside the cylinder member 41. One end of the needle 35 is capable of contacting the intake valve member 32.

The needle guide portion 36 is provided so that an outer wall of the needle guide portion 36 is fitted to an inner wall of the cylinder member 41. The needle guide portion 36 has a guide hole portion 361 in the center. The guide hole portion 361 is formed to connect a wall surface of the needle guide portion 36 facing the pressurizing chamber 103 to a wall surface of the needle guide portion 36 facing away from the pressurizing chamber 103. A needle 35 is inserted through the guide hole portion 361. An inner diameter of the guide hole portion 361 is substantially equal to an outer diameter of the needle 35 or slightly larger than the outer diameter of the needle 35. The inner wall of the guide hole portion 361 and the outer wall of the needle 35 are slidable on each other. As a result, the needle guide portion 36 can guide movement of the needle 35 in the axial direction.

The needle urging member 37 is formed of, for example, a coil spring, and is provided between the pressurizing chamber 103 and the needle guide portion 36. One end of the needle urging member 37 is in contact with a protrusion portion annularly protruding from the needle 35 radially outward, and another end of the needle urging member 37 is provided so as to be in contact with the needle guide portion 36. The needle urging member 37 urges the needle 35 toward the pressurizing chamber 103. Therefore, the needle urging member 37 can urge the intake valve member 32 toward the stopper 33 through the needle 35. The movable core 43 is formed in a substantially cylindrical shape and made of a magnetic material and press-fitted into the other end of the needle 35. As a result, the movable core 43 can reciprocate in the axial direction together with the needle 35. The fixed core 44 is formed in a solid cylindrical shape and made of a magnetic material and is provided on the side of the movable core 43 opposite from the pressurizing chamber 103. An end portion of the fixed core 44 facing the pressurizing chamber 103 is connected to the nonmagnetic member 42.

The coil 45 is formed in a substantially cylindrical shape and is provided radially outward of the fixed core 44 and the nonmagnetic member 42. The periphery of the coil 45 is molded with a resin material to form the connector 46. The connector 46 is insert-molded with a terminal 461. The terminal 461 and the coil 45 are electrically connected to each other.

The cover members 47 and 48 are made of a magnetic material. The cover member 47 is formed in a bottomed cylindrical shape, and accommodates the fixed core 44 and the coil 45 on an inner side of the cover member 47, and a bottom portion of the cover member 47 contacts the fixed core 44. The cover member 48 is formed in a plate shape and has a hole in the center. The cover member 48 is provided so as to close an opening end of the cover member 47 in a state in which the other end of the cylinder member 41 is inserted through the hole. In this example, the cover member 48 contacts the cover member 47 and the cylinder member 41.

The coil 45 generates a magnetic field by being supplied with electric power from the outside through the terminal 461. When a magnetic field is generated in the coil 45, a magnetic circuit is formed in the fixed core 44, the cover member 47, the cover member 48, the cylinder member 41, and the movable core 43, and the movable core 43 is attracted toward the fixed core 44 together with the needle 35. At this time, the magnetic circuit is formed so as to avoid the nonmagnetic member 42.

When no electric power is supplied to the coil 45, the intake valve member 32 is urged toward the pressurizing chamber 103 by an urging force of the needle urging member 37 through the needle 35, and a surface of the intake valve member 32 facing the stopper 33 is in contact with the stopper 33. At this time, since the intake valve member 32 is separated from the intake valve seat 311, the flow of fuel in the intake passage 101 and the intake hole 131 is permitted. On the other hand, when the movable core 43 and the needle 35 are attracted toward the fixed core 44 by supply of electric power to the coil 45, the intake valve member 32 is urged by the urging force of the intake valve urging member 34 or the like to move away from the pressurizing chamber 103, and thereby contacts the intake valve seat 311. As a result, the fuel flow in the intake passage 101 and the intake hole 131 is blocked. In the manner described above, the intake valve device 30 can allow or interrupt the flow of fuel in the intake passage 101 and the intake hole 131 by the operation of the electromagnetic drive portion 40. In the present embodiment, the intake valve device 30 forms a so-called normally open type valve device together with the electromagnetic drive portion 40.

Figure 3:
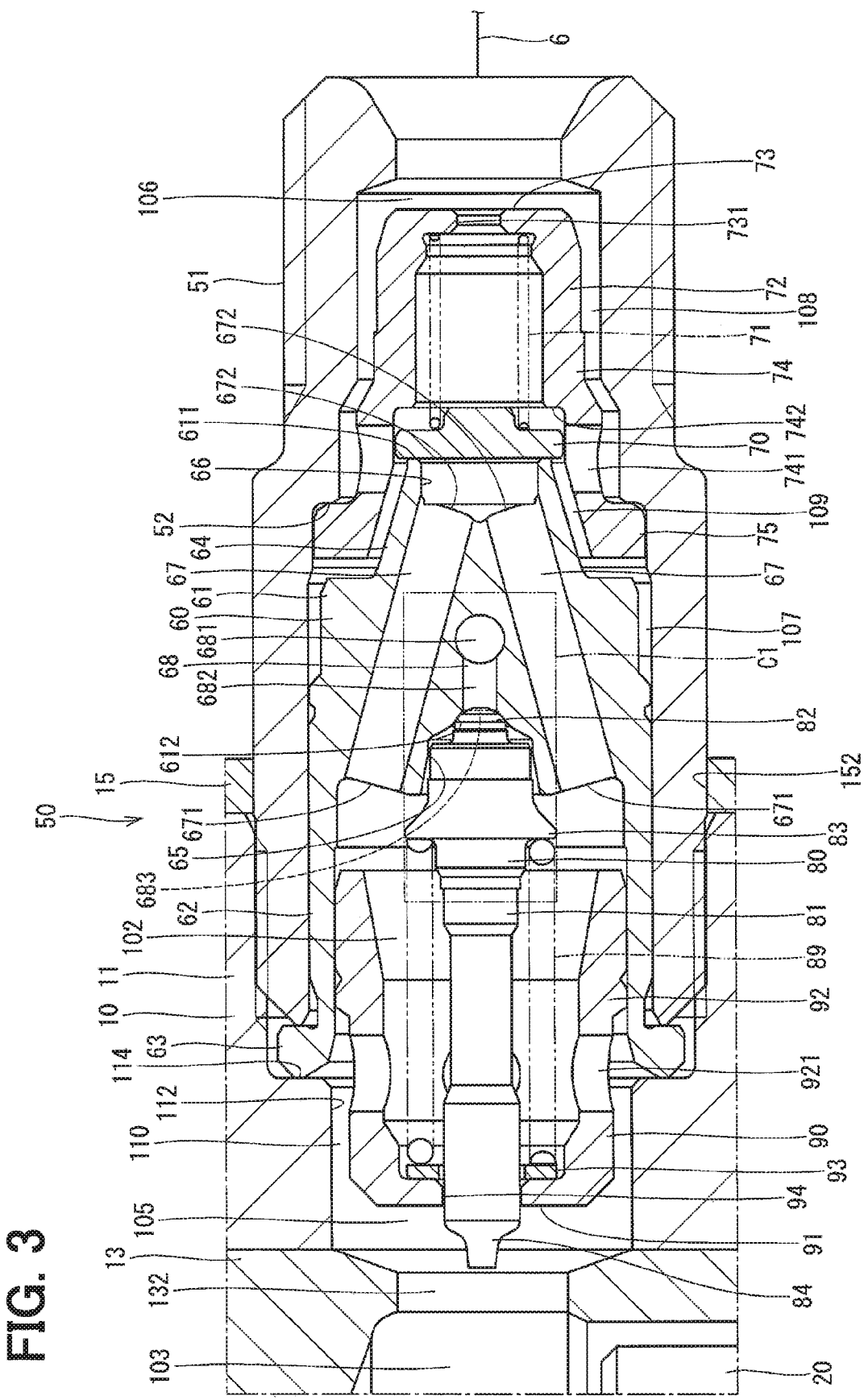
FIG. 3 is a diagram showing a portion III of FIG. 2.

Next, the discharge valve device 50 of the high-pressure pump 1 according to the present embodiment will be described in detail. As illustrated in FIG. 3, the discharge valve device 50 includes a valve seat portion 60, a discharge valve member 70, a discharge valve urging member 71, a relief valve member 80, a relief valve urging member 89, a support portion 90, and the like. The valve seat portion 60 is made of a metal such as stainless steel, and is provided inside the union 51. The valve seat portion 60 includes a valve seat main body 61, a discharge valve passage 67, a relief valve passage 68, a discharge valve seat 611, a relief valve seat 612, a valve seat cylinder portion 62, and a valve seat protrusion portion 63.

The valve seat main body 61 is provided in the discharge passage 102 so as to partition the discharge passage 102 into a first space 105 which is a space positioned between the pressurizing chamber 103 and the valve seat main body 61 and a second space 106 which is a space positioned on the opposite side of the valve seat main body 61 from the pressurizing chamber 103. The valve seat main body 61 is provided so that an outer wall of the valve seat main body 61 adjacent to the pressurizing chamber 103 is in contact with the inner wall of the union 51. A cylindrical space 107, which is a substantially cylindrical space, is provided between an outer wall of the valve seat main body 61 opposite from the pressurizing chamber 103 and the inner wall of the union 51.

The valve seat main body 61 has a recess portion 65 provided on the center of an end face of the valve seat main body 61 facing the first space 105 and recessed toward the second space 106. The recess portion 65 has a bottom portion 651, a cylinder portion 652, and a tapered portion 653 (refer to FIG. 4). The bottom portion 651 is tapered so that a distance between an inner wall of the bottom portion 651 and an axis of the valve seat main body 61 decreases in a direction from the first space 105 toward the second space 106. The cylinder portion 652 is formed so as to extend from the outer edge portion of the bottom portion 651 toward the pressurizing chamber 103. The cylinder portion 652 has a substantially cylindrical inner wall. The tapered portion 653 is formed so as to extend toward the pressurizing chamber 103 from an end portion of the cylinder portion 652 which is opposite from the bottom portion 651, and the tapered portion 653 has an opening on an end face of the valve seat main body 61 facing the pressurizing chamber 103. The tapered portion 653 is tapered so that a distance between an inner wall of the tapered portion 653 and the axis of the valve seat main body 61 decreases in a direction from the first space 105 toward the second space 106.

The valve seat main body 61 has a protrusion portion 64 formed so as to protrude toward the second space 106 from the center of the end face of the valve seat main body 61 facing the second space 106. The protrusion portion 64 is tapered so that a distance between an outer wall of the protrusion portion 64 and the axis decreases in a direction from the first space 105 toward the second space 106. The valve seat main body 61 has a recess portion 66 formed on an end face of the protrusion portion 64 facing away from the pressurizing chamber 103 and recessed toward the pressurizing chamber 103.

The discharge valve passage 67 is provided in the valve seat main body 61 so as to connect the first space 105 to the second space 106. An opening 671 of the discharge valve passage 67 in the first space 105 is provided on the radially outward of the recess portion 65. An opening 672 of the discharge valve passage 67 in the second space 106 is provided at the bottom portion of the recess portion 66. In the present embodiment, two discharge valve passages 67 are provided in the valve seat main body 61. Further, the two discharge valve passages 67 are formed such that the axis of the valve seat main body 61 is interposed therebetween, and the discharge valve passages 67 are inclined with respect to the axis.

The relief valve passage 68 is provided in the valve seat main body 61 so as to connect the second space 106 to the first space 105 without communicating with the discharge valve passage 67. In the present embodiment, the relief valve passage 68 has a first passage 681 and a second passage 682. The first passage 681 extends orthogonally to the axis of the valve seat main body 61, and both end portions of the first passage 681 open to an outer wall of the valve seat main body 61. As a result, the first passage 681 communicates with the cylindrical space 107. The second passage 682 extends along the axis of the valve seat main body 61, and one end of the second passage 682 is connected to the center of the first passage 681. In the second passage 682, the opening 683 at the other end is provided in the bottom portion 651 of the recess portion 65 (refer to FIG. 4). The discharge valve seat 611 is annularly formed at the outer edge portion of the recess portion 66. In other words, the discharge valve seat 611 has an annular shape and surrounds the opening 672 of the discharge valve passage 67 of the valve seat main body 61 in the second space 106.

The relief valve seat 612 has an annular shape and surrounds the opening 683 of the relief valve passage 68 of the valve seat main body 61 in the first space 105. In this example, the relief valve seat 612 is tapered so as to decrease in distance from the axis of the relief valve seat 612 in a direction from the first space 105 toward the second space 106 (refer to FIG. 4). The valve seat cylinder portion 62 is formed so as to extend in a cylindrical shape toward the pressurizing chamber 103 from an outer edge portion of an end face of the valve seat main body 61 facing the first space 105. In this example, an outer wall of the valve seat cylinder portion 62 is in contact with an inner wall of the union 51.

The valve seat protrusion portion 63 has an annular shape and protrudes radially outward from an end portion of the valve seat cylinder portion 62 opposite from the valve seat main body 61. In this example, the valve seat protrusion portion 63 is sandwiched between the step portion 114 of the upper housing 11 and the end portion of the union 51 facing the pressurizing chamber 103. As a result, a relative movement of the valve seat portion 60 relative to the upper housing 11 in the axial direction is limited.

The discharge valve member 70 is formed in a substantially disk shape and made of a metal such as stainless steel. The discharge valve member 70 is provided in the second space 106 so as to be capable of contacting the discharge valve seat 611, and separates from the discharge valve seat 611 or contacts the discharge valve seat 611 to open or close the discharge valve passage 67.

In the present embodiment, the discharge valve device 50 further includes a holder 72. The holder 72 is made of a metal such as stainless steel, and is disposed in the second space 106 inside the union 51. The holder 72 includes a holder bottom portion 73, a holder cylinder portion 74, and a holder protrusion portion 75.

The holder bottom portion 73 is formed in a substantially disk shape, and has a hole portion 731 penetrating in a thickness direction in the center of the holder bottom portion 73. The holder cylinder portion 74 is formed so as to extend cylindrically from an outer edge portion of the holder bottom portion 73 toward the pressurizing chamber 103. A cylindrical space 108 which is a substantially cylindrical space is provided between an outer wall of the holder cylinder portion 74 and an inner wall of the union 51. The protrusion portion 64 of the valve seat main body 61 and the discharge valve member 70 are located inside an end portion of the holder cylinder portion 74 opposite from the holder bottom portion 73. An inner wall of an end portion of the holder cylinder portion 74 opposite from the holder bottom portion 73 is tapered so as to correspond to a shape of the outer wall of the protrusion portion 64. A cylindrical space 109, which is a cylindrical space, is provided between the outer wall of the protrusion portion 64 and the inner wall of the holder cylinder portion 74. The cylindrical space 109 and the cylindrical space 107 communicate with each other through a space between the holder 72 and the valve seat main body 61 (refer to FIG. 3).

The holder cylinder portion 74 has multiple hole portions 741 provided so as to connect an inner wall and an outer wall of the holder cylinder portion 74 in the vicinity of the end portion opposite from the holder bottom portion 73. As a result, the hole portion 741 communicates with the cylindrical space 108 and the cylindrical space 109. In the present embodiment, four hole portions 741 are provided at four intervals in the circumferential direction of the holder cylinder portion 74, for example. With the above configuration, the relief valve passage 68 communicates with the cylindrical space 108 through the cylindrical space 107, the cylindrical space 109, and the hole portion 741. The holder cylinder portion 74 has a step portion 742 on an inner wall of the hole portion 741 behind which the holder bottom portion 73 is positioned. The step portion 742 is formed in a substantially annular shape so that the outer edge portion of the discharge valve member 70 can contact the step portion 742.

The holder protrusion portion 75 is annularly formed so as to protrude radially outward from the end portion of the holder cylinder portion 74 opposite from the holder bottom portion 73. The holder 72 is provided so that the holder protrusion portion 75 is fitted to the inner wall of the union 51 and is in contact with the step portion 52 of the union 51. As a result, relative movement of the holder 72 in the axial direction with respect to the union 51 is restricted.

The discharge valve urging member 71 is, for example, a coil spring, and is provided on a side of the discharge valve member 70 opposite from the valve seat portion 60. The discharge valve urging member 71 is provided inside the holder cylinder portion 74 such that one end of the discharge valve urging member 71 is in contact with the discharge valve member 70 and another end of the discharge valve urging member 71 is in contact with the holder bottom portion 73 of the holder 72. The discharge valve urging member 71 urges the discharge valve member 70 toward the discharge valve seat 611. As a result, the discharge valve member 70 is pressed against the discharge valve seat 611.

The discharge valve member 70 is provided so as to reciprocate inside the holder 72 in the axial direction. The discharge valve member 70 contacts the step portion 742 of the holder 72 to limit the movement toward the holder bottom portion 73. Therefore, the discharge valve member 70 is movable in the axial direction between the discharge valve seat 611 and the step portion 742.

The relief valve member 80 is made of a metal such as stainless steel, for example. In the present embodiment, a hardness of the relief valve member 80 is set to be equal to the hardness of the valve seat portion 60. The relief valve member 80 includes a relief valve main body 81, a relief valve seat portion 82, a valve member protrusion portion 83, and a fuel guide portion 84.

The relief valve main body 81 is formed in a rod shape, more specifically, a substantially columnar shape. The relief valve member 80 is disposed in the first space 105 so as to be arranged that the end portion 811 which is one end of the relief valve main body 81 is located inside the recess portion 65 of the valve seat main body 61 and the other end of the relief valve main body 81 faces the pressurizing chamber 103 In the first space 105. A large diameter portion 812 is formed on a side of the end portion 811 of the relief valve main body 81 facing the pressurizing chamber 103. The end portion 811 and the large diameter portion 812 are formed in a substantially columnar shape. The large diameter portion 812 has an outer diameter set to be larger than the outer diameter of the end portion 811 (refer to FIG. 4). An outer diameter of the end portion 811 is slightly smaller than an inner diameter of the cylinder portion 652 of the recess portion 65. For that reason, a substantially cylindrical gap is provided between the end portion 811 and the cylinder portion 652.

The relief valve seat portion 82 is integrally formed with the relief valve main body 81 at one axial end (first end) (end portion 811) of the relief valve main body 81 so as to be capable of contacting the relief valve seat 612. More specifically, the relief valve seat portion 82 has a substantially columnar shape and projects from the center of the end portion 811 of the relief valve main body 81 toward the second space 106. A side of the relief valve seat portion 82 facing the second space 106 includes a first tapered surface 821 and a second tapered surface 822. The first tapered surface 821 is tapered so as to decrease in distance from the axis of the relief valve seat portion 82 in a direction from the first space 105 toward the second space 106. The second tapered surface 822 is formed on the second space 106 side of the first tapered surface 821 so as to be connected to the first tapered surface 821. The second tapered surface 822 is tapered so as to decrease in distance from the axis of the relief valve seat portion 82 in the direction from the first space 105 toward the second space 106. In this example, an angle between a virtual straight line extending along the first tapered surface 821 and the axis of the relief valve seat portion 82 is smaller than an angle between a virtual straight line extending along the second tapered surface 822 and the axis of the relief valve seat portion 82 (refer to FIG. 4). Therefore, an edge is formed (in a boundary) between the first tapered surface 821 and the second tapered surface 822.

Figure 4:
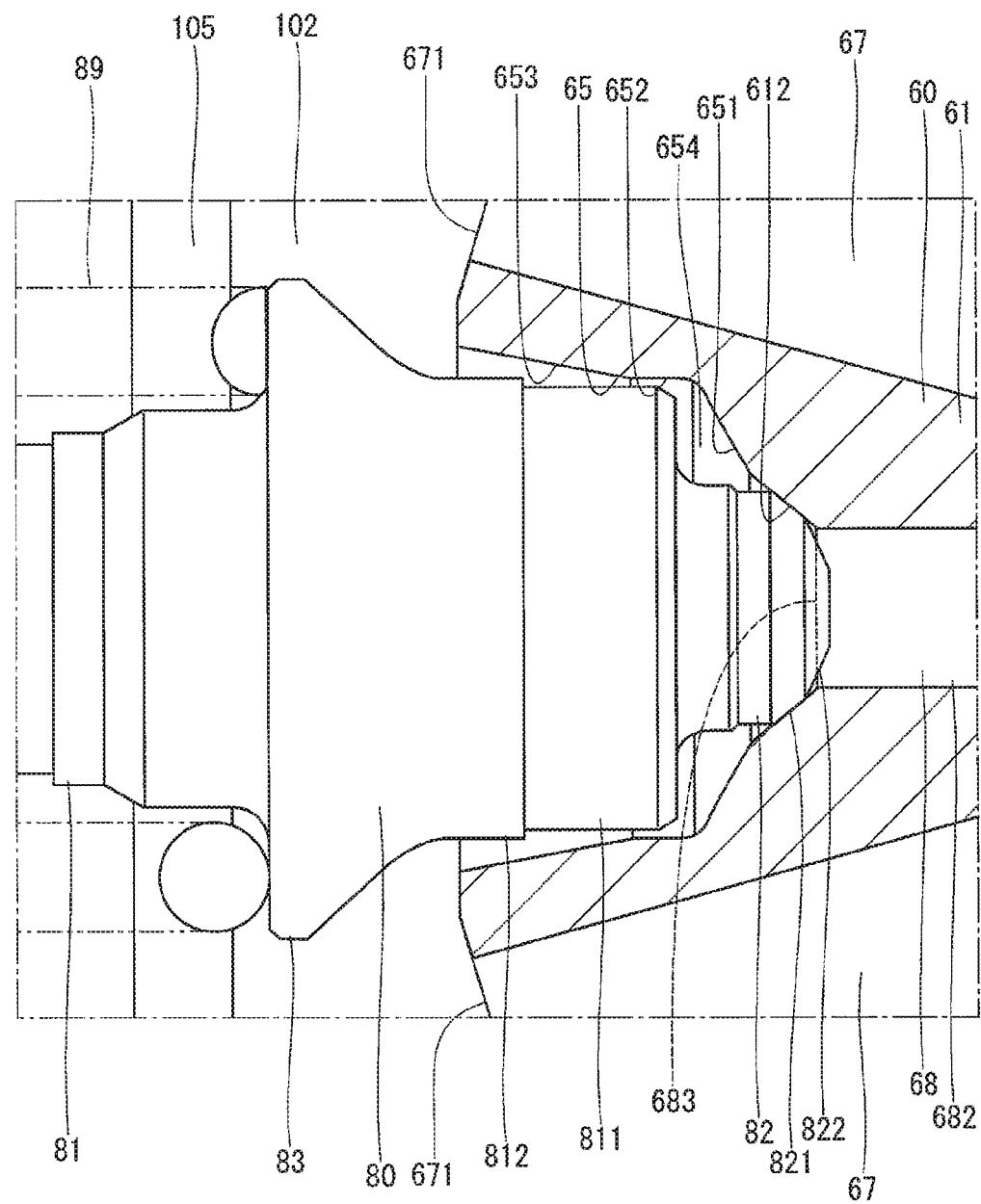
FIG. 4 is a cross-sectional view showing a vicinity of a relief valve seat in the high-pressure pump according to the first embodiment.

In the present embodiment, the angle formed by the virtual straight line extending along the first tapered surface 821 and the axis of the relief valve seat portion 82 is set to be substantially equal to an angle formed by the virtual straight line extending along the relief valve seat 612 and the axis of the relief valve seat portion 612. For that reason, in the relief valve member 80, the first tapered surface 821 can contact the relief valve seat 612 by surface contact. When the first tapered surface 821 and the relief valve seat 612 come in surface contact with each other, the relief valve seat portion 82 and the relief valve seat 612 are in a coaxial relationship. In this manner, the relief valve member 80 and the relief valve seat 612 are aligned by the first tapered surface 821 and the relief valve seat 612. As shown in FIG. 4, an intermediate chamber 654 which is an annular space is provided between the relief valve seat portion 82 and the bottom portion 651 and the cylinder portion 652 of the recess portion 65. The valve member protrusion portion 83 has an annular shape and projects radially outward from an end of the large diameter portion 812 of the relief valve main body 81 facing the pressurizing chamber 103.

The fuel guide portion 84 is provided at the other end of the relief valve main body 81, that is, at the end portion of the relief valve main body 81 facing the pressurizing chamber 103, and is formed integrally with the relief valve main body 81. The fuel guide portion 84 is formed such that a distance between the outer wall of the first specific shape portion 861 and the axis increases in a direction from the pressurizing chamber 103 toward the valve seat portion 60. For that reason, the fuel flowing from the pressurizing chamber 103 toward the valve seat portion 60 is guided so as to flow in a direction radially outward of the relief valve main body 81 when flowing along the outer wall of the fuel guide portion 84. The relief valve member 80 is provided in the first space 105 so as to reciprocate in an axial direction of the relief valve main body 81.

In the present embodiment, the opening 671 of the discharge valve passage 67 in the first space 105 is provided outside of a virtual cylindrical surface C1 that passes through an outermost portion (i.e. outer wall of the valve member protrusion portion 83) of an outer wall of the relief valve member 80 and extends in a cylindrical shape in the axial direction of the relief valve main body 81 (refer to FIG. 3).

The relief valve urging member 89 is formed of, for example, a coil spring, and the relief valve main body 81 is inserted through the inside of the relief valve urging member 89. In other words, the relief valve urging member 89 is provided on a radially outer side of the relief valve main body 81. One end of the relief valve urging member 89 is in contact with a wall surface of the valve member protrusion portion 83 facing the pressurizing chamber 103.

The support portion 90 is formed of a metal such as stainless steel, and is provided in the first space 105. In the present embodiment, a hardness of the support portion 90 is set to be lower than the hardness of the valve seat portion 60 and the relief valve member 80. The support portion 90 includes a support main body 91, a support cylinder portion 92, and a spring seat member 93.

The support main body 91 is formed in a substantially disc shape. The support main body 91 has the guide hole portion 94. The guide hole portion 94 is formed so as to penetrate through a center of the support main body 91 in a plate thickness direction. The relief valve main body 81 of the relief valve member 80 is inserted through the guide hole portion 94. The guide hole portion 94 has an inner diameter substantially equal to an outer diameter of the other end of the relief valve main body 81, i.e. an outer diameter of an end portion of the relief valve main body 81 facing the pressurizing chamber 103, or somewhat larger than an outer diameter of the end portion of the relief valve main body 81 facing the pressurizing chamber 103. Therefore, the inner wall of the guide hole portion 94 can slide with the outer wall of the other axial end (second end) side of the relief valve main body 81.

The support cylinder portion 92 is formed so as to extend substantially in a cylindrical shape from the outer edge portion of the support main body 91 toward the valve seat portion 60. The support portion 90 is provided such that an outer wall of an end portion of the support cylinder portion 92 opposite from the support main body 91 is fitted to an inner wall of the valve seat cylinder portion 62. As a result, the support portion 90 is provided so as not to be movable relative to the valve seat portion 60, and supports the relief valve member 80 by the support main body 91 so that the relief valve member 80 can reciprocate in the axial direction. In this manner, the support main body 91 of the support portion 90 slidably supports the outer wall of the relief valve main body 81 so as to guide the reciprocating movement of the relief valve member 80 in the axial direction. A cylindrical space 110, which is a substantially cylindrical space, is provided between an outer wall of the end portion of the support cylinder portion 92 adjacent to the support main body 91 and the inner wall of the upper housing 11 forming the discharge hole portion 112.

The support cylinder portion 92 has multiple hole portions 921 provided so as to connect the inner wall and the outer wall of the support cylinder portion 92. As a result, the hole portion 921 communicates with the space inside the support cylinder portion 92 and the cylindrical space 110. In the present embodiment, for example, four hole portions 921 are provided at regular intervals in the circumferential direction of the support cylinder portion 92.

The spring seat member 93 is formed in a substantially disk shape separately from the support main body 91 and the support cylinder portion 92. The spring seat member 93 is provided on a side of the support main body 91 facing the valve seat portion 60. The spring seat member 93 has a hole portion penetrating in the plate thickness direction at the center, and an end portion of the relief valve main body 81 facing the pressurizing chamber 103 is inserted into the hole portion.

The other end of the relief valve urging member 89 is in contact with a surface of the spring seat member 93 facing the valve seat portion 60. The relief valve urging member 89 presses the spring seat member 93 against the support main body 91 and urges the relief valve member 80 toward the relief valve seat 612. As a result, the first tapered surface 821 of the relief valve seat portion 82 is pressed against the relief valve seat 612.

When a pressure of the fuel in the first space 105 is higher than a total of a pressure of the fuel in the second space 106 and an urging force of the discharge valve urging member 71 (the valve opening pressure of the discharge valve member 70), the discharge valve member 70 is separated from the discharge valve seat 611 and opened. At this time, the pressurizing chamber 103 communicates with a space inside the end portion of the union 51 adjacent to the pipe 6 through the discharge hole 132, the cylindrical space 110, the hole portion 921, inner spaces of the support cylinder portion 92 and the valve seat cylinder portion 62, the discharge valve passage 67, the recess portion 66, the hole portion 741, and the cylindrical space 108. As a result, the fuel from the pressurizing chamber 103, that is, the fuel in the first space 105 is discharged toward the pipe 6, i.e. to the second space 106, through the discharge valve seat 611. The valve opening pressure of the discharge valve member 70 can be set by adjusting the urging force of the discharge valve urging member 71.

On the other hand, when a pressure of the fuel in the second space 106 is higher than a total of the pressure of the fuel in the first space 105 and an urging force of the relief valve urging member 89 (the valve opening pressure of the relief valve member 80), the relief valve member 80 is separated from the relief valve seat 612 and opened. At this time, the space inside the end portion of the union 51 adjacent to the pipe 6 communicates with the pressurizing chamber 103 through the cylindrical space 108, the hole portion 741, the cylindrical space 109, the cylindrical space 107, the first passage 681 of the relief valve passage 68, the second passage 682, the recess portion 65, the spaces inside the valve seat cylinder portion 62 and the support cylinder portion 92, the hole portion 921, the cylindrical space 110, and the discharge hole 132. As a result, the fuel from the pipe 6, that is, the fuel in the second space 106 is returned toward the pressurizing chamber 103, i.e. to the first space 105, through the relief valve seat 612. As a result, the pressure of the fuel in the second space 106 can be prevented from increasing abnormally. The valve opening pressure of the relief valve member 80 can be set by adjusting the urging force of the relief valve urging member 89.

Further, in the present embodiment, the urging force of the relief valve urging member 89 is set to be larger than the extent that the end portion 811 of the relief valve member 80 does not come out of the recess portion 65. For that reason, the end portion 811 of the relief valve member 80 is prevented from coming out of the recess portion 65. As described above, the discharge valve device 50 according to the present embodiment is a relief valve integrated discharge valve device having both of a function as the discharge valve and a function as the relief valve.

Next, the operation of the high-pressure pump 1 according to the present embodiment will be described with reference to FIG. 2.

"Intake Process"

When the supply of an electric power to the coil 45 of the electromagnetic drive portion 40 is stopped, the intake valve member 32 is urged toward the pressurizing chamber 103 by the needle urging member 37 and the needle 35. Therefore, the intake valve member 32 is separated from the intake valve seat 311, that is, is opened. In this state, when the plunger 20 moves toward the cam 5, a volume of the pressurizing chamber 103 increases, and the fuel in the intake passage 101 is suctioned into the pressurizing chamber 103.

"Metering Process"

When the plunger 20 moves in a direction away from the cam 5 in a state in which the intake valve member 32 is opened, the volume of the pressurizing chamber 103 decreases, and the fuel in the pressurizing chamber 103 returns to the fuel gallery 100 of the intake passage 101. When the electric power is supplied to the coil 45 during a metering process, the movable core 43 is attracted toward the fixed core 44 together with the needle 35, and the intake valve member 32 contacts and closes the intake valve seat 311. When the plunger 20 moves in the direction away from the cam 5, the intake valve member 32 is closed to block a communication between the pressurizing chamber 103 and the fuel gallery 100 of the intake passage 101, thereby adjusting the amount of fuel returned from the pressurizing chamber 103 to the fuel gallery 100 of the intake passage 101. As a result, the amount of fuel pressurized in the pressurizing chamber 103 is determined. The intake valve member 32 is closed, to thereby terminate the metering process of returning the fuel from the pressurizing chamber 103 to the fuel gallery 100 of the intake passage 101.

"Pressurizing Process"

When the plunger 20 further moves in the direction away from the cam 5 in a state where the intake valve member 32 is closed, a volume of the pressurizing chamber 103 decreases, and the fuel in the pressurizing chamber 103 is compressed and pressurized. When the pressure of the fuel in the pressurizing chamber 103 becomes equal to or higher than a valve opening pressure of the discharge valve member 70, the discharge valve member 70 opens and the fuel is discharged from the pressurizing chamber 103 toward the pipe 6, i.e. to the second space 106.

When the supply of power to the coil 45 is stopped and the plunger 20 moves toward the cam 5, the intake valve member 32 opens again. As a result, the pressurizing process for pressurizing the fuel is completed, and the intake process of sucking the fuel from the fuel gallery 100 of the intake passage 101 to the pressurizing chamber 103 is restarted.

With the repetition of the "intake process", "metering process" and "pressurizing process" described above, the high-pressure pump 1 pressurizes and discharges the sucked fuel in the fuel tank 2 and supplies the fuel to the fuel rail 7. The supply amount of fuel from the high-pressure pump 1 to the fuel rail 7 is adjusted by controlling a supply timing of the electric power to the coil 45 of the electromagnetic drive portion 40 and the like.

For example, when a state in which the supply of the electric power to the coil 45 is stopped is continued for a predetermined period of time, the intake valve member 32 maintains the valve open state. Therefore, the fuel is not pressurized in the pressurizing chamber 103, and the fuel is not supplied from the high-pressure pump 1 to the fuel rail 7. Even when the intake valve member 32 is maintained in the valve open state due to some cause, such as the fixing of the intake valve member 32, the fuel is not pressurized in the pressurizing chamber 103, and the fuel is not supplied from the high-pressure pump 1 to the fuel rail 7.

On the other hand, for example, when the supply of the electric power to the coil 45 continues for the predetermined period of time, the intake valve member 32 is closed in the pressurizing process. Therefore, the fuel is pressurized in the pressurizing chamber 103, supplied from the high-pressure pump 1 to the rail 7, and the pressure of the fuel in the second space 106, the pipe 6, and the fuel rail 7 increases. Even when the intake valve member 32 is maintained in the valve close state due to some reason such as fixing of the intake valve member 32, the fuel is pressurized in the pressurizing chamber 103 and supplied from the high-pressure pump 1 to the fuel rail 7, and the pressure of the fuel in the second space 106, the pipe 6, and the fuel rail 7 increases.

Figure 5:
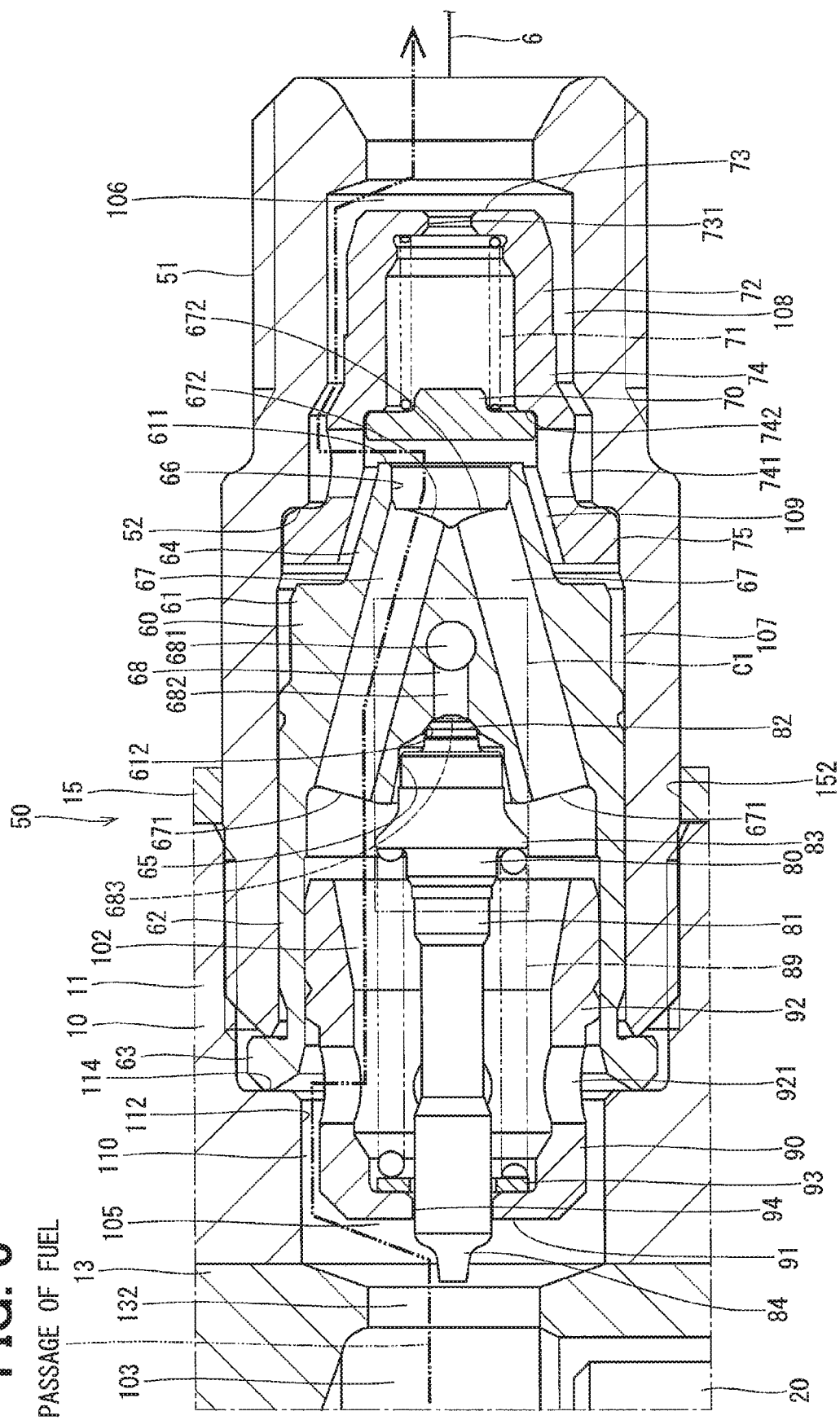
FIG. 5 is a cross-sectional view showing a discharge valve device of the high-pressure pump according to the first embodiment, which illustrates a state in which a fuel flows toward the fuel rail through the discharge valve seat.

Next, the operation of the discharge valve device 50 of the high-pressure pump 1 according to the present embodiment will be described. As shown in FIG. 5, when the pressure of the fuel in the first space 105 becomes larger than the valve opening pressure of the discharge valve member 70, the discharge valve member 70 separates from the discharge valve seat 611 and opens. At this time, the fuel in the pressurizing chamber 103 can flow into the space inside the end portion of the union 51 adjacent to the pipe 6 through the discharge hole 132, the cylindrical space 110, the hole portion 921, the spaces inside the support cylinder portion 92 and the valve seat cylinder portion 62, the discharge valve passage 67, the recess portion 66, the hole portion 741, and the cylindrical space 108.

In the present embodiment, the support main body 91 of the support portion 90 slidably supports the outer wall of the relief valve main body 81 so as to guide the movement of the relief valve member 80 in the axial direction. For that reason, even if the fuel discharged from the pressurizing chamber 103 flows around the relief valve member 80, the relief valve seat portion 82 of the relief valve member 80 is prevented from relatively moving or oscillating in the radial direction with respect to the relief valve seat 612. As a result, wear of the relief valve seat 612 or the relief valve seat portion 82 can be reduced.

Further, in the present embodiment, the relief valve seat portion 82 is formed integrally with the relief valve main body 81. For that reason, the relief valve seat portion 82 and the relief valve main body 81 do not move relative to each other. Therefore, the position of the relief valve seat portion 82 is stabilized, for example, as compared with a configuration in which the relief valve main body 81 and the relief valve seat portion 82 are formed separately from each other.

In the present embodiment, the opening 671 of the discharge valve passage 67 in the first space 105 is provided outside of a virtual cylindrical surface C1 that passes through an outermost portion (outer wall of the valve member protrusion portion 83) of an outer wall of the relief valve member 80 and extends in a cylindrical shape in the axial direction of the relief valve main body 81. For that reason, when the fuel is discharged from the pressurizing chamber 103, the fuel around the relief valve main body 81 can smoothly flow into the discharge valve passage 67 without being blocked by the valve member protrusion portion 83 of the relief valve member 80.

When the discharge valve member 70 is open, the fuel flowing from the pressurizing chamber 103 to the valve seat portion 60 in the vicinity of the fuel guide portion 84 of the relief valve member 80 is guided to flow in the radially outward direction of the relief valve main body 81 by the fuel guide portion 84. As a result, the fuel can be prevented from entering a space between the guide hole portion 94 of the support portion 90 and the relief valve main body 81. For that reason, the cavitation erosion can be prevented from occurring between the guide hole portion 94 and the relief valve main body 81, and erosion of the guide hole portion 94 of the support portion 90 can be reduced.

Figure 6:
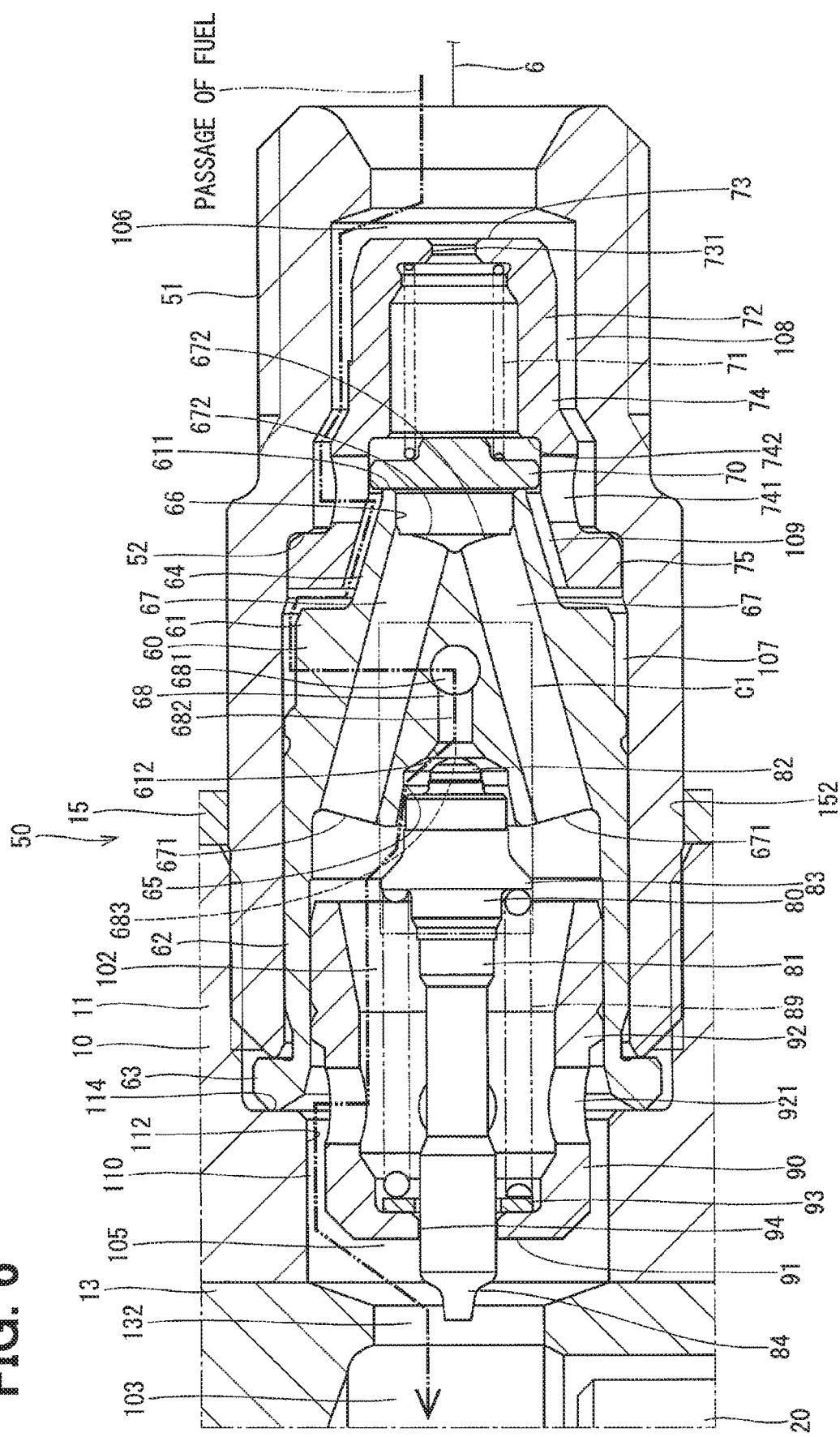
FIG. 6 is a cross-sectional view showing the discharge valve device of the high-pressure pump according to the first embodiment, which illustrates a state in which the fuel flows toward the pressurizing chamber through the relief valve seat.

As shown in FIG. 6, when the pressure of the fuel in the second space 106 becomes larger than the valve opening pressure of the relief valve member 80, the relief valve member 80 separates from the relief valve seat 612 and opens. At this time, the fuel in the space inside the end portion of the union 51 adjacent to the pipe 6 can flow toward the pressurizing chamber 103 through the cylindrical space 108, the hole portion 741, the cylindrical space 109, the cylindrical space 107, the first passage 681 of the relief valve passage 68, the second passage 682, the recess portion 65, the spaces inside the valve seat cylinder portion 62 and the support cylinder portion 92, the hole portion 921, the cylindrical space 110, and the discharge hole 132.

In the present embodiment, the support main body 91 of the support portion 90 slidably supports the outer wall of the relief valve main body 81 so as to guide the reciprocating movement of the relief valve member 80 in the axial direction. As a result, when the relief valve member 80 opens, the movement of the relief valve member 80 toward the pressurizing chamber 103 is stabilized.

Further, in the present embodiment, when the relief valve seat portion 82 is separated from the relief valve seat 612, the fuel in the relief valve passage 68 flows into the intermediate chamber 654 (refer to FIG. 4). As a result, the pressure in the intermediate chamber 654 quickly rises, and the relief valve member 80 can be promptly moved toward the pressurizing chamber 103. The fuel in the intermediate chamber 654 flows between the cylinder portion 652 and the tapered portion 653 of the recess portion 65 and the end portion 811 and the large diameter portion 812 of the relief valve main body 81 toward the pressurizing chamber 103.

As described above, (1) in the present embodiment, the pump body 10 includes the pressurizing chamber 103 for pressurizing the fuel and the discharge passage 102 through which the fuel pressurized by and discharged from the pressurizing chamber 103 flows. The valve seat portion 60 includes the valve seat main body 61, a discharge valve passage 67, the relief valve passage 68, the discharge valve seat 611, and the relief valve seat 612.

The valve seat main body 61 is provided in the discharge passage 102 so as to partition the discharge passage 102 into a first space 105 which is a space positioned between the valve seat main body 61 and the pressurizing chamber 103 and a second space 106 which is a space positioned on the opposite side of the valve seat main body 61 from the pressurizing chamber 103. The discharge valve passage 67 is provided in the valve seat main body 61 so as to connect the first space 105 to the second space 106. The relief valve passage 68 is provided in the valve seat main body 61 so as to connect the second space 106 to the first space 105 and not to communicate with the discharge valve passage 67. The discharge valve seat 611 has an annular shape and surrounds the opening 672 of the discharge valve passage 67 of the valve seat main body 61 in the second space 106. The relief valve seat 612 has an annular shape and surrounds the opening 683 of the relief valve passage 68 of the valve seat main body 61 in the first space 105.

The discharge valve member 70 is provided in the second space 106 so as to be capable of contacting the discharge valve seat 611, and separates from the discharge valve seat 611 or contacts the discharge valve seat 611 to open or close the discharge valve passage 67. The discharge valve urging member 71 urges the discharge valve member 70 toward the discharge valve seat 611. The relief valve member 80 includes a relief valve main body 81 and a relief valve seat portion 82. The relief valve main body 81 is formed in a rod shape. The relief valve seat portion 82 is formed integrally with the relief valve main body 81 at one end of the relief valve main body 81 so as to be capable of contacting the relief valve seat 612. The relief valve member 80 is provided in the first space 105 so as to reciprocate in the axial direction. The relief valve urging member 89 urges the relief valve member 80 toward the relief valve seat 612. The support portion 90 includes a support main body 91 that slidably supports an outer wall of the relief valve main body 81 so as to guide a reciprocating movement of the relief valve member 80 in the axial direction.

In the present embodiment, the support main body 91 of the support portion 90 slidably supports the outer wall of the relief valve main body 81 so as to guide the reciprocating movement of the relief valve member 80 in the axial direction. For that reason, even if the fuel discharged from the pressurizing chamber 103 in the high-pressure pump 1 flows around the relief valve member 80, the relief valve seat portion 82 of the relief valve member 80 is prevented from relatively moving or oscillating in the radial direction with respect to the relief valve seat 612. As a result, wear of the relief valve seat 612 or the relief valve seat portion 82 can be reduced. Therefore, a change over time in the valve opening pressure of the relief valve member 80 can be reduced.

Further, in the present embodiment, the relief valve seat portion 82 is formed integrally with the relief valve main body 81. For that reason, the relief valve seat portion 82 and the relief valve main body 81 do not move relative to each other. Therefore, the position of the relief valve seat portion 82 is stabilized, for example, as compared with a configuration in which the relief valve main body 81 and the relief valve seat portion 82 are formed separately from each other. Therefore, the wear of the relief valve seat 612 or the relief valve seat portion 82 can be further reduced.

(2) In the present embodiment, the support portion 90 slidably supports the outer wall of the other end side of the relief valve main body 81, that is, the end portion on the pressurizing chamber 103 side. For that reason, the axis of the relief valve member 80 can be effectively prevented from being inclined during the reciprocating movement of the relief valve member 80. Since a sliding portion between the inner wall of the support portion 90 and the outer wall of the relief valve main body 81 is located at a position far from the relief valve seat 612, the inner wall of the support portion 90 and the outer wall of the relief valve main body 81 are abraded by sliding. Even if abrasion powder is generated, the abrasion powder can be prevented from being caught between the relief valve seat 612 and the relief valve seat portion 82.

(3) In the present embodiment, the valve seat main body 61 has a recess portion 65 provided so as to be recessed from an end face of the valve seat main body 61 on the first space 105 side toward the second space 106 side. The relief valve seat 612 is formed at the bottom portion 651 of the recess portion 65. Therefore, the relief valve member 80 is provided so that the end portion 811 on the relief valve seat 612 side is located in the recess portion 65. An intermediate chamber 654 of variable capacity is provided between the end portion 811 of the relief valve member 80 and the recess portion 65. When the relief valve seat portion 82 moves away from the relief valve seat 612, a pressure in the intermediate chamber 654 rapidly increases. As a result, the relief valve member 80 can promptly move toward the pressurizing chamber 103, that is, in the valve opening direction.

(4) In the present embodiment, the relief valve seat 612 is tapered so as to reduce an inner diameter of the relief valve seat 612 from the first space 105 side toward the second space 106 side. As a result, when the relief valve member 80 contacts the relief valve seat 612, the relief valve member 80 is aligned with respect to the relief valve seat 612.

(5) In the present embodiment, the first tapered surface 821 and the second tapered surface 822 of the relief valve seat portion 82 are tapered so as to reduce inner diameters of the first and second tapered surfaces from the first space 105 side toward the second space 106 side. For that reason, the first tapered surface 821 of the relief valve seat portion 82 and the tapered relief valve seat 612 can contact each other by surface contact. Therefore, a surface pressure between the relief valve seat portion 82 and the relief valve seat 612 can be reduced, and wear of the relief valve seat 612 or the relief valve seat portion 82 can be effectively reduced.

(7) In the present embodiment, the opening 671 of the discharge valve passage 67 on the first space 105 side is provided outside of a virtual cylindrical surface C1 that passes through an outermost portion (outer wall of the valve member protrusion portion 83) of an outer wall of the relief valve member 80 and extends in a cylindrical shape in the axial direction of the relief valve main body 81. For that reason, when the fuel is discharged from the pressurizing chamber 103, the fuel around the relief valve main body 81 can smoothly flow into the discharge valve passage 67 without being blocked by the valve member protrusion portion 83 of the relief valve member 80. Therefore, the fuel can be smoothly discharged from the pressurizing chamber 103 toward the pipe 6 and the fuel rail 7.

(8) In the present embodiment, the valve seat portion 60 has the valve seat cylinder portion 62 that extends in the cylindrical shape from the valve seat main body 61 to the first space 105 side. The support portion 90 has the support cylinder portion 92 that extends in the cylindrical shape from the support main body 91 toward the second space 106 and is fitted to the inner wall of the valve seat cylinder portion 62. As described above, the support portion 90 that slidably supports the relief valve member 80 and the valve seat portion 60 having the relief valve seat 612 are integrated with each other so as not to be movable relative to each other. For that reason, a contact position between the relief valve seat portion 82 of the relief valve member 80 and the relief valve seat 612 can be prevented from becoming unstable. As a result, wear of the relief valve seat 612 or the relief valve seat portion 82 can be effectively reduced.

(9) In the present embodiment, the relief valve member 80 has a valve member protrusion portion 83 formed so as to project radially outward from the relief valve main body 81. One end of the relief valve urging member 89 is in contact with the valve member protrusion portion 83 and the other end is provided so as to be in contact with the support portion 90.

Further, as described above, the valve seat cylinder portion 62 is fitted to the support cylinder portion 92, thereby being capable of unitizing the valve seat portion 60, the relief valve member 80, the relief valve urging member 89, and the support portion 90. This makes it easy to set the urging force of the relief valve urging member 89 to a desired magnitude. Further, the discharge valve device 50 including the relief valve member 80 can be easily assembled to the pump body 10 of the high-pressure pump 1.

(10) In the present embodiment, the relief valve urging member 89 is a coil spring formed in a cylindrical shape, and the relief valve urging member is provided on a radially outer side of the relief valve main body 81. For that reason, the relief valve urging member 89 can stably urge the relief valve member 80 toward the relief valve seat 612 in the axial direction. As a result, when the relief valve member 80 reciprocates in the axial direction, the inclination of the shaft is restricted. As a result, the wear of the relief valve seat 612 or the relief valve seat portion 82 can be reduced more effectively.

(11) In the present embodiment, the pump body 10 includes a cylindrical union 51 forming the discharge passage 102 on the inside and the upper housing 11 into which one end of the union 51 is inserted. The valve seat portion 60 includes a valve seat protrusion portion 63 formed to project radially outward and sandwiched between one end of the union 51 and the step portion 114 of the upper housing 11. As a result, a relative movement of the valve seat portion 60 relative to the upper housing 11 and the union 51 in the axial direction is restricted.

Second Embodiment

Figure 7:
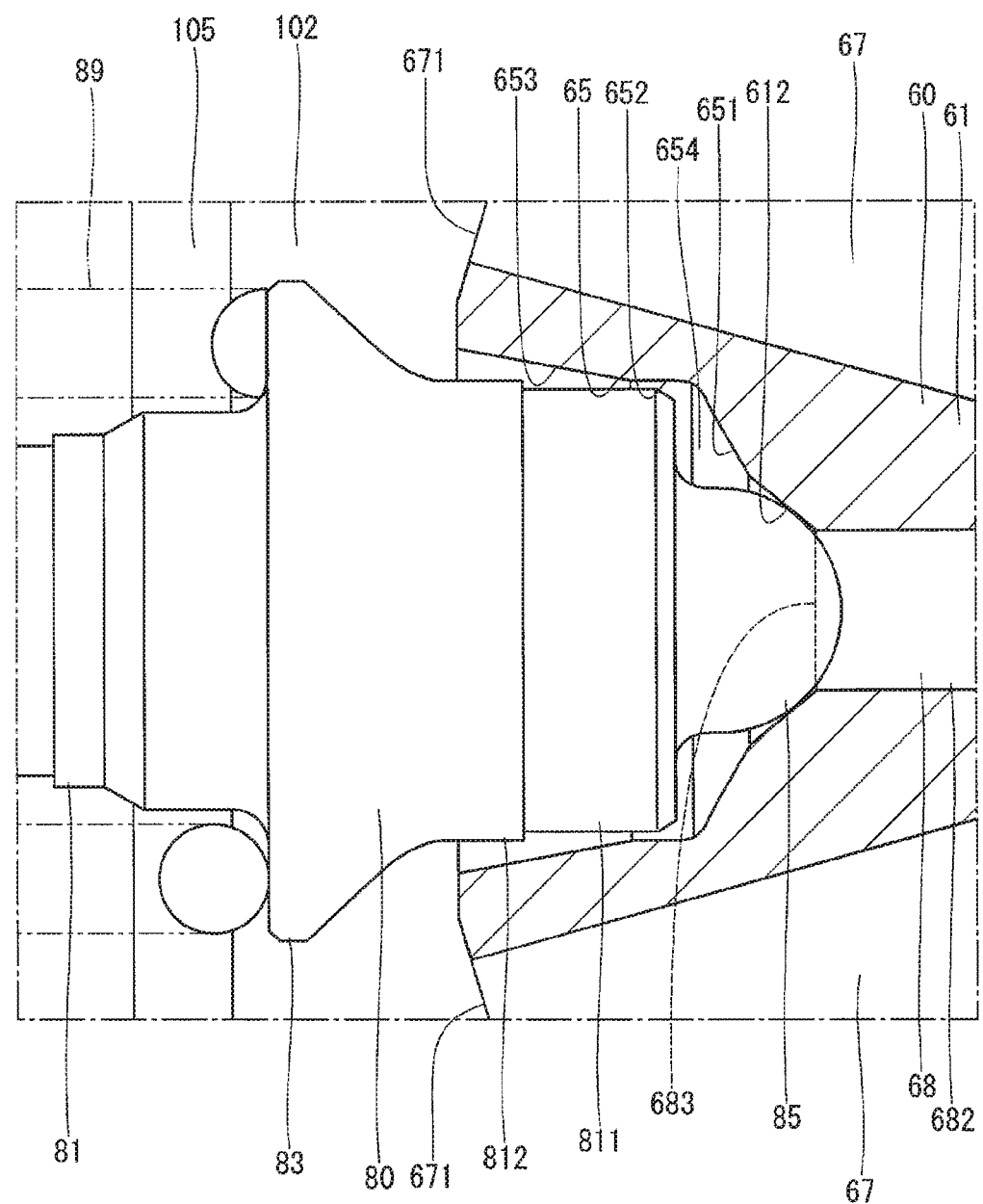
FIG. 7 is a cross-sectional view showing a vicinity of a relief valve seat of a high-pressure pump according to a second embodiment of the present disclosure.

A part of a high-pressure pump according to a second embodiment of the present disclosure is illustrated in FIG. 7. The second embodiment is different from the first embodiment in the shape of the relief valve seat portion of the relief valve member 80.

In the second embodiment, the relief valve seat portion 85 is formed in a spherical shape. For that reason, in the relief valve member 80, the relief valve seat portion 85 can contact the relief valve seat 612 by line contact. When the relief valve seat portion 82 and the relief valve seat 612 come in line contact with each other, the relief valve seat portion 82 and the relief valve seat 612 are in a coaxial relationship. In this manner, the relief valve member 80 and the relief valve seat 612 are aligned by the relief valve seat portion 85 and the relief valve seat 612.

As described above, (6) in the present embodiment, the relief valve seat portion 85 is formed in a spherical shape. For that reason, the relief valve seat portion 85 and the tapered relief valve seat 612 can contact each other by line contact. Therefore, the surface pressure between the relief valve seat portion 85 and the relief valve seat 612 can be increased, and the relief valve seat portion 85 and the relief valve seat 612 can be liquid-tightly held when the relief valve member 80 is closed. In the present embodiment, since the relief valve seat portion 85 is formed in a spherical shape, even when the surface pressure between the relief valve seat portion 85 and the relief valve seat 612 is large, the wear of the relief valve seat portion 85 and the relief valve seat 612 can be reduced.

Other Embodiments

In the embodiments described above, the support main body 91 of the support portion 90 slidably supports the outer wall of the other end side of the relief valve main body 81, that is, the end portion on the pressurizing chamber 103 side. In contrast, in another embodiment of the present disclosure, the support main body 91 of the support portion 90 may slidably support any position of the relief valve main body 81 in the axial direction.

In another embodiment of the present disclosure, the valve seat main body 61 may not have the recess portion 65 recessed from the end face on the first space 105 side toward the second space 106 side. In this case, the relief valve seat 612 is formed on the end face of the valve seat main body 61 on the side of the first space 105. Further, in another embodiment of the present disclosure, the relief valve seat 612 is not limited to the tapered shape and may be formed in a planar shape. In another embodiment of the present disclosure, the relief valve seat portion is not limited to the tapered shape or the spherical shape, and may be formed in any shape such as the planar shape.

In the present embodiment described above, the opening 671 of the discharge valve passage 67 on the side of the first space 105 is provided outside of a virtual cylindrical surface C1 that passes through an outermost portion of the outer wall of the relief valve member 80 and extends in a cylindrical shape in the axial direction of the relief valve main body 81. On the other hand, according to another embodiment of the present disclosure, the opening 671 of the discharge valve passage 67 on the side of the first space 105 may be provided such that at least a part of the opening 671 is located inside the virtual cylindrical surface C1. Also, the number of the discharge valve passages 67 is not limited to two, and one or three or more discharge valve passages 67 may be provided.

Further, in the embodiments described above, the example in which the support cylinder portion 92 of the support portion 90 is fitted to the inner wall of the valve seat cylinder portion 62 of the valve seat portion 60 is shown. On the contrary, in another embodiment of the present disclosure, the support cylinder portion 92 may be fitted to the outer wall of the valve seat cylinder portion 62.

Further, in another embodiment of the present disclosure, the valve seat portion 60 may not have the valve seat cylinder portion 62. Further, the support portion 90 may not have the support cylinder portion 92. In other words, the valve seat portion 60 and the support portion 90 may not be fitted to each other. In this case, it is conceivable to provide the support portion 90 (the support main body 91) by being fitted to the inner wall of the upper housing 11 forming the discharge hole portion 112.

Also, in another embodiment of the present disclosure, the relief valve member 80 may not have the valve member protrusion portion 83. In this case, it is considered that the relief valve urging member 89 is provided to contact the end portion of the relief valve member 80 opposite from the relief valve seat portion 82, or in a predetermined position of the relief valve member 80 in the axial direction. Further, in another embodiment of the present disclosure, the relief valve urging member 89 is not limited to the coil spring, and may be formed by, for example, a leaf spring or the like.

Further, in another embodiment of the present disclosure, the union 51 may be integrally formed with the upper housing 11. In this case, the valve seat protrusion portion 63 of the valve seat portion 60 may be omitted. Further, in another embodiment of the present disclosure, at least two of the cylinder, the upper housing, and the lower housing may be integrated together.

Further, in another embodiment of the present disclosure, the intake valve device may configure a normally closed type (normally closed valve type) valve device together with an electromagnetic drive portion. Further, as long as the intake valve device configures a normally closed type valve device, there is no need to provide the electromagnetic drive portion.

In another embodiment of the present disclosure, the pulsation damper may not be installed inside the cover. Further, the cover may not be provided. In the case of the configuration without the cover member, it is conceivable to directly supply the fuel to the intake passage of the pump body. In another embodiment of the present disclosure, the high-pressure pump may be used as a fuel pump that discharges the fuel toward a device or the like other than the engine of the vehicle. As described above, the present disclosure is not limited to the above embodiments, but can be implemented in various configurations without departing from the spirit of the present invention.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

The invention claimed is:

1. A high-pressure pump comprising:
a pump body including a pressurizing chamber that pressurizes a fuel, and a discharge passage through which the fuel flows after being pressurized by and discharged from the pressurizing chamber;
a valve seat portion that includes a valve seat main body which is provided in the discharge passage to partition the discharge passage into a first space positioned between the valve seat main body and the pressurizing chamber and a second space positioned on an opposite side of the valve seat main body from the pressurizing chamber, a discharge valve passage which is provided in the valve seat main body and connects the first space and the second space, a relief valve passage which is provided in the valve seat main body and connects the second space and the first space without communicating with the discharge valve passage, a discharge valve seat having an annular shape and surrounding an opening of the discharge valve passage of the valve seat main body in the second space, and a relief valve seat having an annular shape and surrounding an opening of the relief valve passage of the valve seat main body in the first space;
a discharge valve member provided in the second space and capable of contacting the discharge valve seat, wherein the discharge valve member opens or closes the discharge valve passage when separating from the discharge valve seat or contacting the discharge valve seat;
a discharge valve urging member urging the discharge valve member toward the discharge valve seat;
a relief valve member provided in the first space and reciprocable in an axial direction, the relief valve member including a relief valve main body having a rod shape, and a relief valve seat portion which is integrally formed with a first end of the relief valve main body in the axial direction and is capable of contacting the relief valve seat;
a relief valve urging member that urges the relief valve member toward the relief valve seat; and
a support portion that includes a support main body which slidably supports an outer wall of the relief valve main body on a side of the relief valve urging member opposite from the relief valve seat, and
guides reciprocating movement of the relief valve member in the axial direction wherein the discharge valve member is configured to separate from the discharge valve seat due to a pressure in the first space which allows flow from the first space to the second space, and
the relief valve member is configured to separate from the relief valve seat due to pressure in the second space which allows flow from the second space to the first space.

2. The high-pressure pump according to claim 1, wherein the support portion slidably supports the outer wall of the relief valve main body at a second end of the relief valve main body in the axial direction.

3. The high-pressure pump according to claim 1, wherein the valve seat main body includes a recess portion provided on an end surface facing the first space and recessed toward the second space, and
the recess portion includes a bottom portion on which the relief valve seat is provided, a cylinder portion extending from an outer edge of the bottom portion toward the pressurizing chamber and having a cylindrical inner surface, and a tapered portion extending from a side of the cylinder portion opposite from the bottom portion toward the pressurizing chamber and having a tapered shape such that a distance between an inner wall of the tapered portion and an axis of the valve seat main body decreases in a direction from the first space toward the second space,
the relief valve main body includes an end portion which is located on a side of the relief valve seat portion facing the pressurizing chamber and is larger in outer diameter than the relief valve seat portion, and
when the relief valve seat portion contacts the relief valve seat, a cylindrical gap is formed between the end portion and the cylinder portion and between the end portion and the tapered portion.

4. The high-pressure pump according to claim 1, wherein the relief valve seat is tapered to reduce in inner diameter in a direction from the first space toward the second space.

5. The high-pressure pump according to claim 1, wherein the relief valve seat portion includes a first tapered surface having a tapered shape such that a distance between the first tapered surface and an axis of the relief valve seat portion decreases in a direction from the first space toward the second space, and a second tapered surface connected to the first tapered surface and positioned between the first tapered surface and the second space, the second tapered surface having a tapered shape such that a distance between the second tapered surface and the axis of the relief valve seat portion decreases in the direction from the first space toward the second space,
an angle between a virtual straight line extending along the first tapered surface and the axis of the relief valve seat portion is smaller than an angle between a virtual straight line extending along the second tapered surface and the axis of the relief valve seat portion, and
when the relief valve seat portion contacts the relief valve seat, a cylindrical gap is formed between the second tapered surface and the relief valve seat.

6. The high-pressure pump according to claim 1, wherein the relief valve seat portion has a spherical shape and is capable of contacting the relief valve seat by line contact.

7. The high-pressure pump according to claim 1, wherein an opening of the discharge valve passage in the first space is located outside a virtual cylindrical surface that passes through an outermost part of the outer wall of the relief valve member, the virtual cylindrical surface extending in the axial direction of the relief valve main body.

8. The high-pressure pump according to claim 1, wherein the valve seat portion includes a valve seat cylinder portion that is cylindrical and extends from the valve seat main body toward the first space, and the support portion includes a support cylinder portion that is cylindrical and extends from the support main body toward the second space and that is fitted to an inner wall or an outer wall of the valve seat cylinder portion.

9. The high-pressure pump according to claim 1, wherein the relief valve member includes a valve member protrusion portion protruding radially outward from the relief valve main body, and one end of the relief valve urging member is in contact with the valve member protrusion portion, and another end of the relief valve urging member is in contact with the support portion, and the valve member protrusion portion has a connection portion connected to the relief valve main body, and an outer wall of the connection portion facing the relief valve seat is curved.

10. The high-pressure pump according to claim 9, wherein the relief valve urging member is a coil spring having a cylindrical shape, and the relief valve urging member is provided radially outward of the relief valve main body.

11. The high-pressure pump according to claim 1, wherein the pump body includes a cylindrical union forming the discharge passage therein, and a housing into which an end of the union is inserted, and the valve seat portion includes a valve seat protrusion portion protruding radially outward and being sandwiched between the end of the union and the housing.

* * * * *